United States Patent
Hamelmann et al.

(10) Patent No.: US 12,533,074 B2
(45) Date of Patent: Jan. 27, 2026

(54) MONITORING SYSTEM AND METHOD FOR MONITORING MILK FLOW DURING BREAST FEEDING OR MILK EXPRESSION

(71) Applicant: KONINKLIJKE PHILIPS N.V., Eindhoven (NL)

(72) Inventors: Paul Christoph Hamelmann, Aachen (DE); Yannyk Parulian Julian Bourquin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 472 days.

(21) Appl. No.: 17/776,620

(22) PCT Filed: Nov. 11, 2020

(86) PCT No.: PCT/EP2020/081681
§ 371 (c)(1),
(2) Date: May 13, 2022

(87) PCT Pub. No.: WO2021/104858
PCT Pub. Date: Jun. 3, 2021

(65) Prior Publication Data
US 2022/0395218 A1    Dec. 15, 2022

(30) Foreign Application Priority Data
Nov. 26, 2019 (EP) .................... 19211556

(51) Int. Cl.
*A61B 5/00* (2006.01)
*A41C 3/04* (2006.01)
(Continued)

(52) U.S. Cl.
CPC .............. *A61B 5/4288* (2013.01); *A41C 3/04* (2013.01); *A61B 5/0082* (2013.01);
(Continued)

(58) Field of Classification Search
CPC .... A61M 2205/502; A61M 2205/3334; A61M 2205/52; A61M 2205/3584;
(Continued)

(56) References Cited

U.S. PATENT DOCUMENTS 5,827,191 A    10/1998   Rosenfeld
2005/0080351 A1    4/2005   Larsson
(Continued)

FOREIGN PATENT DOCUMENTS

| EP | 3469980 A1 | 4/2019 |
| ES | 2311413 A1 | 2/2009 |
| WO | 2006/054287 A1 | 5/2006 |

OTHER PUBLICATIONS

Ganesh, LeCarpentier GL, Roubidoux M, Fowlkes JB, Schott AF, Carson PL. Spatial registration of temporally separated whole breast 3D ultrasound images. Med Phys. Sep. 2009;36(9):4288-300. doi: 10.1118/1.3193678. PMID: 19810503; PMCID: PMC2749445. (Year: 2009).*

(Continued)

*Primary Examiner* — Michael J Carey
*Assistant Examiner* — Zainab Mohammed Aldarraji

(57) ABSTRACT

A monitoring system for monitoring milk flow during breast feeding or milk expression uses a flow sensor arrangement to monitor milk flow levels from different regions of the breast. A map of milk flow levels for different regions of the breast is then generated and displayed.

19 Claims, 3 Drawing Sheets

(51) Int. Cl.
*A61B 8/00* (2006.01)
*A61B 8/08* (2006.01)
*A61M 1/06* (2006.01)
*G01F 1/663* (2022.01)

(52) U.S. Cl.
CPC .......... *A61B 5/6804* (2013.01); *A61B 8/0825* (2013.01); *A61B 8/488* (2013.01); *A61M 1/062* (2014.02); *G01F 1/663* (2013.01)

(58) Field of Classification Search
CPC .. A61M 2205/3375; A61M 2205/3306; A61M 1/062; A61B 8/4227; A61B 8/488; A61B 8/0825; A61B 5/6804; A61B 5/0082; A61B 5/4288; G01F 1/663; A41C 3/04
See application file for complete search history.

(56) References Cited

U.S. PATENT DOCUMENTS

| | | | |
|---|---|---|---|
| 2009/0054771 A1 | 2/2009 | Kolberg | |
| 2010/0130866 A1 | 5/2010 | Main | |
| 2011/0098566 A1* | 4/2011 | Zhang | A61B 8/465 600/443 |
| 2014/0046188 A1 | 2/2014 | Yen | |
| 2014/0276061 A1 | 9/2014 | Lee | |
| 2014/0343420 A1* | 11/2014 | Zhang | A61B 8/13 600/437 |
| 2016/0058361 A1 | 3/2016 | Melamed | |
| 2016/0220743 A1 | 8/2016 | Guthrie | |

OTHER PUBLICATIONS

International Search Report and Written Opinion Dated Feb. 2, 2021 For International Application No. PCT/EP2020/091681 Filed Nov. 11, 2020.
Geddes: "The use of ultrasound to identify milk ejection in women—tips and pitfalls", International Breastfeeding Journal, Biomed Central Ltd., vol. 4, No. 1, Jun. 1, 2009.
Ramsay, et al: "Anatomy of the lactating human breast redefined with ultrasound imaging", Journal of Anatomy, vol. 206, No. 6, Jun. 16, 2005.
Donna Geddes: "Ultrasound imaging of the lactating breast: methodology and application", International Breastfeeding Journal 2009.
Going, et al: "Escaping from Flatland: clinical and biological aspects of human mammary duct anatomy in three dimensions", J Pathol 2004; 203: 538-544.
Goyal, et al: "Breastfeeding practices: Positioning, attachment (latch-on) and effective suckling—A hospital-based study in Libya", Journal of Family and Community Medicine | Aug. 2011 | vol. 18 | Issue 2 | 74-79.
From the American Academy of Pediatrics: "Breastfeeding and the Use of Human Milk", Pediatrics vol. 129, No. 3, Mar. 2012.
Van Der Hoek, et al: "Cutaneous perfusion of the human lactating breast: a pilot study with laser Doppler perfusion monitoring", 2019 Physiol. Meas.
The Coro Breastfeeding Monitor https://www.coroflo.com/product.html.

* cited by examiner

MONITORING SYSTEM AND METHOD FOR MONITORING MILK FLOW DURING BREAST FEEDING OR MILK EXPRESSION

CROSS REFERENCE TO RELATED APPLICATIONS

This application is the U.S. National Phase application under 35 U.S.C. § 371 of International Application No. PCT/EP2020/081681 filed Nov. 11, 2020, which claims the benefit of European Patent Application Number 19211556.6 filed Nov. 26, 2019. These applications are hereby incorporated by reference herein.

FIELD OF THE INVENTION

This invention relates to a monitoring system and method for monitoring milk flow during breast feeding or during milk expression using a breast pump, in particular for detecting milk flow ducts which are blocked or becoming blocked.

BACKGROUND OF THE INVENTION

Breast feeding is the most natural way of infant feeding and it is associated with many short term and long term medical and neurodevelopmental advantages. It is well known that breast feeding drastically reduces the risk of sudden infant death syndrome, respiratory tract infections, gastrointestinal tract infections, necrotizing enterocolitis, allergic diseases, inflammatory bowel disease, celiac disease, obesity, childhood leukemia and lymphomia. It also improves neurodevelopmental outcomes. Consequently, the American Academy of Pediatrics strongly recommends mothers to breastfeed for 1 year or longer.

Besides the clear health benefits, breast feeding also improves maternal-infant bonding. It is therefore most natural that women want to breast feed. However, breast feeding is also associated with a variety of problems. Some mothers are not able to breast feed, breast feeding can be painful, and mothers find it often challenging to assess whether their baby is provided with sufficient milk. Plugged milk ducts can cause a tender or painful lump within the breast and, in the worst case, lead to breast inflammation.

One concern of mothers is that they have doubts whether they produce and give sufficient milk to their baby. In addition, mastitis, cracked nipples and sore nipples are significantly associated with poor positioning and attachment, which are crucial for effective breast feeding. These nipple conditions mean that many mothers unwillingly quit early with breastfeeding.

In a breast, multiple milk ducts are present, and each of them originates from a specific region containing the milk secreting alveoli.

To provide greater insights into the milk flow of the lactating human breast, different technological approaches have been developed. In a clinical setting, ultrasound imaging and ultrasound Doppler technology is a promising tool to investigate milk flow or to detect a pathological lactating breast. It has for example been proposed in US 2009/0054771 to use Doppler ultrasound sensors, integrated into a wearable brassiere, to monitor milk flow during breast feeding sessions. Alternatively, it has been proposed to monitor physiological changes in the mammary cutaneous perfusion during milk ejection using Laser Doppler perfusion monitoring. Overall milk flow volumes may also be measured using a nipple shield with an integrated flow sensor.

For mothers, having information on milk flow is important. However, monitoring milk flow alone does not help them to provide better feeding to their baby, or to reduce the possible discomfort and pain in their daily routines. Many first time mothers or young mothers particularly need support and guidance on correct breast feeding techniques. For example, it is recommended to change the feeding position so that every part of the breast is emptied. Typically, when the baby latches on, the area of the breast closest to the baby's chin is emptied.

EP 3 469 980 discloses a system for determining the fullness of the breast, and hence able to monitor the milk consumption based on the change in fullness. A stiffness sensor is used to monitor the breast, and the stiffness is mapped to a breast fullness level.

Geddes Donna T, "The use of ultrasound to identify milk ejection in women-tips and pitfalls", International Breastfeeding Journal, Biomed Central Ltd, LO, XP021059960, discloses the use of ultrasound to image a lactating breast, so that milk duct dilation and milk flow can be assessed.

There is therefore a need for a method and system which can assist mothers with breast feeding.

SUMMARY OF THE INVENTION

The invention is defined by the claims.

According to examples in accordance with an aspect of the invention, there is provided a monitoring system for monitoring milk flow during breast feeding, comprising:
- an acoustic or optical flow sensor arrangement for application to the breast for monitoring milk flow levels from different regions of the breast;
- a processor for generating a map of milk flow levels for different regions of the breast; and
- a display device for displaying the map as an image with a representation of a front view of the breast.

This system monitors milk flow within the breast. By creating a milk flow map, milk ducts with low flow can be detected early before severe problems develop, because the reduction in milk flow from a localized area of the breast becomes visible. The image may for example color code different flow levels. The generated flow map allows personalized guidance to be given on how to position the baby during a next feeding session, reducing the occurrence of blocked milk ducts and discomfort.

Thresholds may be applied to the flow levels to enable detection of blocked ducts.

The processor is for example for generating a 2D map of milk flow levels for different areas in a 2D plane. This provides a simple and intuitive representation. The 2D plane is for example parallel to a frontal plane of the breast feeding mother. Thus, it is a representation of a front view of the breast from which different areas can be easily identified and recognized.

The milk flow level is for example an average flow per unit area of the 2D map for a breast feeding session or part of a breast feeding session. Other measures may be used such as a peak flow or other statistical representation of the flow conditions associated with each particular area.

The flow sensor arrangement comprises an acoustic or optical flow sensor arrangement. The purpose is to monitor flow along the milk ducts.

In one set of examples, the flow sensor arrangement comprises an ultrasound sensor and the processor is adapted to obtain the flow levels by performing Doppler ultrasound processing. This is a known approach for measuring flow information internally within the body from an externally applied sensor.

The processor may be adapted to:
identify milk ducts by ultrasound image analysis;
determine the direction of the milk ducts; and
determine flow levels in the milk duct directions.

In this way, the milk flow information may be obtained more accurately, by determining the milk flow in the direction of the milk flow ducts rather than a general flow, e.g. in a general outward direction.

The processor may be further adapted to identify milk duct diameters. This information can assist in the identification of blocked milk ducts in addition to the flow information.

The flow sensor arrangement for example comprises an array of sensor patches for application to the breast. The use of an array of sensor patches enables better resolution and accuracy of the flow information across the area of the breast.

The processor may be adapted to obtain a reference map of flow levels for different regions of the breast before the commencement of breast feeding, and to generate the map of milk flow levels taking into account the reference map. This reference map functions as a calibration and enables blood flow information to be filtered out from the milk flow measurements.

The flow sensor arrangement may be integrated into a brassiere or a breast pump expression kit. When used as part of a breast pump expression kit it may be used to detect the milk ejection reflex (MER) or number of milk ejection reflexes which may in turn be used in the control of the breast pump.

The processor may be adapted to generate advisory information for the mother based on an analysis of the map of milk flow levels. This advisory information may advise of a blocked milk duct, or a milk duct which is becoming blocked, or it may give information about the best position for the baby for optimizing the breast feeding session.

The invention also provides a method for monitoring milk flow during breast feeding, comprising:
obtaining signals from an acoustic or optical flow sensor arrangement which is applied to the breast, and which monitors milk flow levels from different regions of the breast;
generating a map of milk flow levels for different regions of the breast; and
displaying the map as an image with a representation of a front view of the breast.

The method for example comprises generating a 2D map of milk flow levels for different areas in a 2D plane and determining a milk flow level as an average flow per unit area of the 2D map for a breast feeding session or part of a breast feeding session.

The method may be implemented in software.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
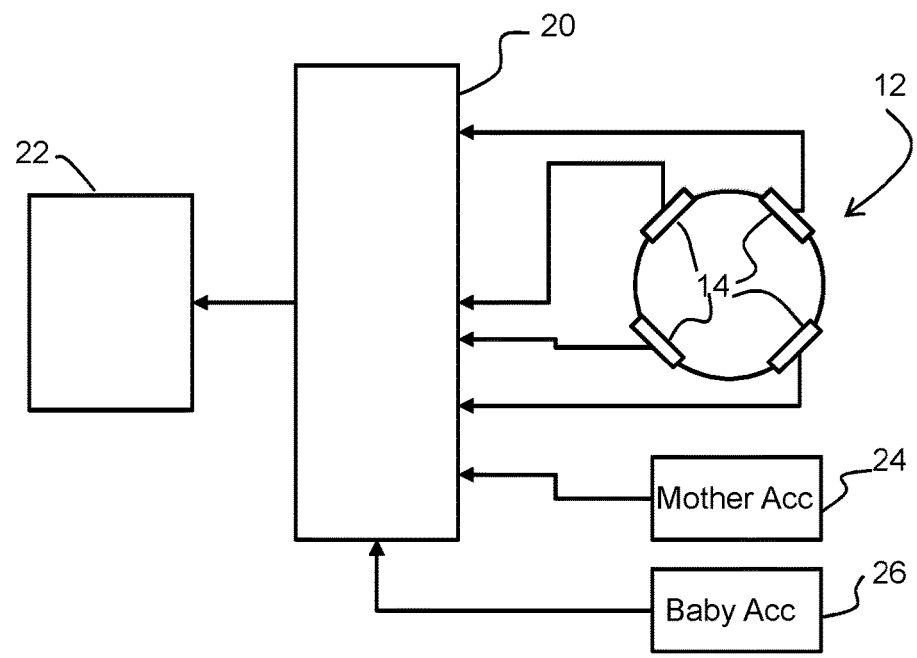
FIG. 1 shows a monitoring system for monitoring milk flow during breast feeding or during expression using a breast pump.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a monitoring system for monitoring milk flow during breast feeding or during milk expression. The system uses a flow sensor arrangement to monitor milk flow levels from different regions of the breast. A map of milk flow levels for different regions of the breast is then generated and displayed.

FIG. 1 shows a monitoring system for monitoring milk flow during breast feeding or during expression using a breast pump. The system comprises a flow sensor arrangement 12 for application to the breast for monitoring milk flow levels from different regions of the breast. The flow sensor arrangement may comprise a single flow sensor, but the example of FIG. 1 shows an array of sensors 14 for positioning against different regions of the breast.

The milk flow levels do not need to be numerical values (such as flow rates); they may simply be normalized relative values, namely indications of relatively high flow rate and relatively low flow rate.

The different regions are typically 3D volumes of the breast. However, as will be clear from the discussion below, it is typically sufficient to consider the flow only associated with (i.e. through) regions of a 2D plane which generally extends across the full area of the breast. Thus, a 2D plane may represent the top, bottom and sides of the breast, and the flow associated with different locations within this plane is of interest.

A processor 20 generates a map of milk flow levels for different regions of the breast based on the flow sensor arrangement signals. A display device 22 is used for displaying the map as an image.

The display device may be a device with an array of pixels such as a remote display device with which the processor communicates. However, it may be a more simple device such as an array of LEDs integrated into a garment, whereby the location of an illuminated LED directly represents an underlying area of the breast, and a type of light output (e.g. color) may represents a breast condition.

This system monitors milk flow within the breast. By creating a milk flow map, milk ducts with low flow can be detected early before severe problems develop, because the reduction in milk flow from a localized region of the breast becomes visible. The image may for example color code different flow levels.

Figure 2:
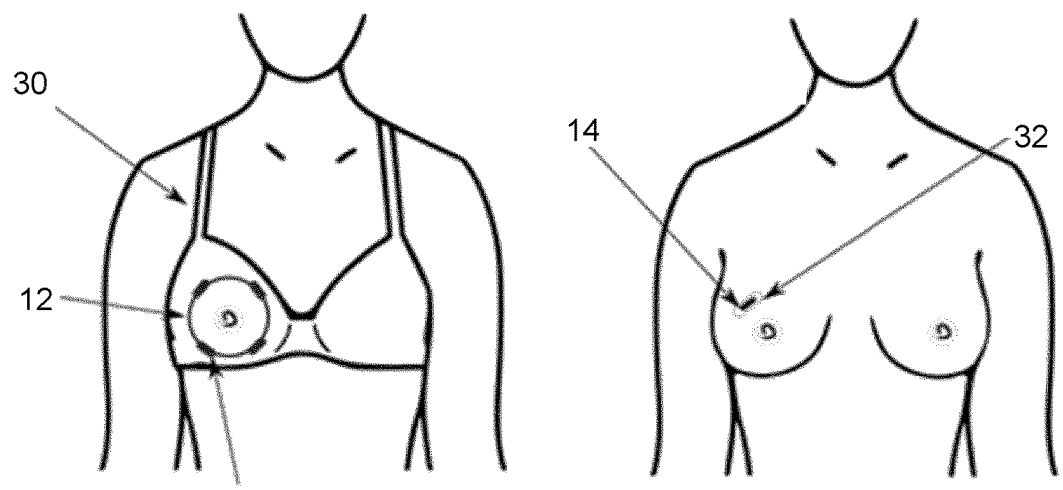
FIG. 2 shows that the flow sensor arrangement may be integrated into a brassiere type garment or a wearable patch.

FIG. 2 shows in the left image that the flow sensor arrangement 12 may be integrated into a brassiere type garment 30. The use of multiple sensors 14 ensures that milk flow from the whole breast volume can be measured. Instead of a brassiere type garment 30, a milk flow sensor 14 may be integrated into a wearable patch 32 as shown in the right image of FIG. 2. There may be one or more such patches.

Different technologies are known (acoustic and optical) for measuring milk flow or changes in the mammary cutaneous perfusion during milk ejection.

In a preferred implementation, a Doppler ultrasound sensor is used to measure milk flow through the milk ducts.

Figure 3:
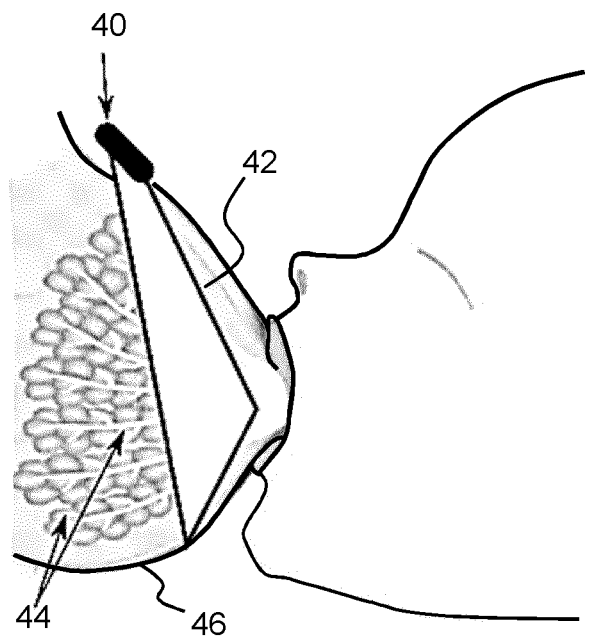
FIG. 3 shows a Doppler ultrasound sensor for the flow sensing.

FIG. 3 shows a Doppler ultrasound sensor 40 having a field of view 42 which includes the milk ducts 44 of the breast 46. The measured Doppler signal is dependent on the direction of the milk flow relative to the ultrasound beam direction so that the determined flow is not directly equal to the flow along the milk duct.

In one approach, with a known placement position of the one or more sensors relative to the breast, and the assumption that the milk flow ducts are directed towards the nipple (which may for example be a location at the center of a ring of ultrasound sensors 14) the measured Doppler flow velocity may be converted into a flow rate (e.g. milk volume per unit time) along the milk duct direction.

In another approach, the orientation of the milk ducts may be determined relative to the ultrasound sensor arrangement, by analysis of acquired ultrasound images. In this case, the processor may perform 3D ultrasound imaging as well as Doppler ultrasound imaging.

This enables quantitative measurements of the milk flow rate.

However, for generating a flow map for the purpose of support and guidance, and detection of plugged milk ducts, qualitative milk flow estimation is sufficient (relative flow rate information or total flow volume information for a breast feeding session, as between different regions of the breast).

Note that the flow level obtained may not be directional at all. For example, instead of obtaining flow information from the Doppler signal directly, only the amplitude of the Doppler signal (i.e. the power Doppler) may be used. No directional flow information is then obtained, but such measurements are less dependent on Doppler angle, allowing detection of low flow velocities.

When 3D ultrasound imaging is used, changes in duct diameter may also be automatically obtained from acquired ultrasound images to obtain information on milk flow levels. A change in milk duct diameter is physiologically linked to the milk ejection reflex (MER) and not necessarily to milk flow directly. As a consequence, a blocked milk duct may still vary its diameter during feeding due to the MER. However, combined measurements of milk duct diameter from ultrasound image analysis combined with Doppler flow information may be used to accurately determine the milk flow through the milk ducts. A blocked milk duct may also be detected from the combination of detected change in duct diameter and absence of, or reduction of milk flow.

The use of a wearable ultrasound patch means the milk ducts are less compressed compared to measurements with a conventional ultrasound transducer, allowing improved milk flow monitoring.

The ultrasound transducer is for example a CMUT sensor or sensor array or a PMUT sensor or sensor array. For good acoustic coupling between the sensor arrangement and the skin, ultrasound gel may be added. Alternatively, recently developed hydrogels may be used to guarantee good acoustic coupling.

The processor 20 is for example for generating a 2D map of milk flow levels for different areas in a 2D plane. As shown in FIG. 3, the sensor arrangement has a field of view which includes a vertical plane through the breast 46. The vertical plane is more generally parallel to a frontal plane of the breast feeding mother (i.e. is only vertical when the mother is upright). The ultrasound transducer may use electronic beam steering for adjustment of the direction of the plane. Flow information through different planes may then be acquired and subsequently combined into the 2D plane.

Possibly, the orientation of the mother/breast could be measured using accelerometers, which would give some indication about the deformation of the breast during feeding, which could then be taken into account.

Figure 4:
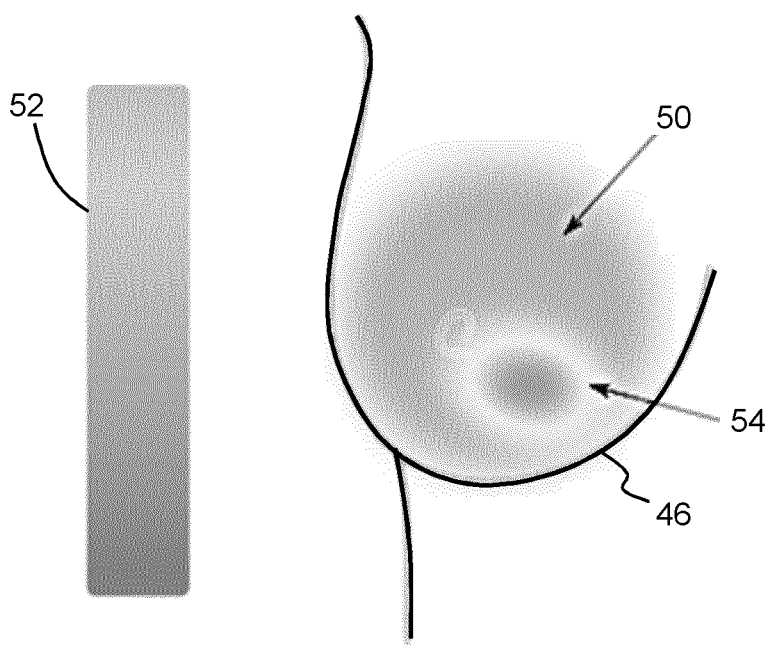
FIG. 4 shows a 2D flow map.

FIG. 4 shows a 2D map as a greyscale image 50 with a greyscale key 52, Of course in practice, a color image and color key will be appropriate. The region 54 represents an area of low milk flow, thus representing a possible plugged duct. The image includes the whole breast and thus shows the outer contour of the breast so that the position of the different flow areas with respect to the breast as a whole may be derived.

This provides a simple and intuitive representation. Thus, it is a representation of a front view of the breast from which different regions can be easily identified and recognized. The 2D map is combined with or overlaid over the representation of the front view of the breast. In this example, a 2D image provides a simplified representation without the need for depth information, In particular, the representation in the image of FIG. 4 is sufficient to provide a mother with an indication of the flow situation as well as enabling her to take action to address the issue.

As mentioned above, flow measurements from multiple sensors may be combined by relying on the fact that the sensors are integrated into a garment at known relative positions. Alternatively, position sensors such as gyroscopes or accelerometers or any type of beacons (e.g. infrared) may be used to identify the positions of the individual sensors. These possible location sensors are shown as unit 24 in FIG. 1. A flow map may however be generated even from a single sensor.

The flow map may be created by taking the average flow per unit area during the whole breast feeding session or periodically during the breast feeding session (in which case it may evolve in real time during a feed/expression). In addition, the average flow per unit area of the 2D plane may be normalized using the overall average flow.

The flow in the different regions of the breast can be compared to detect low milk flow, possibly indicative of blocked milk ducts. In addition, a threshold value may be set to identify low flow in regions of the breast which can be considered to be at risk for blocked ducts. The flow map may be saved and used for monitoring over several breast feeding sessions. The average of flow maps from several days can then be used to detect a potential increased risk of blocked duct.

Additional sensors, such as accelerometers or gyroscope can also be used to detect the suckling movement of the baby. Such sensors are shown as unit 26 in FIG. 1. When used with a breast pump, the vacuum level of the pump may be monitored and this is indicative of movement of the breast pump expression kit.

In both of these cases, the determined movements may be used to process (i.e. filter) the signal obtained by the ultrasound sensors in order to remove noise artefacts due to movement. The breast pump vacuum cycle may be used to synchronize the sampling moment to the movement of the baby or breast pump.

Augmented reality (AR) may be used to display the flow map directly on the breast of the user using the camera of a smartphone or tablet, either live or from a still image. The flow map may even be directly displayed on the brassiere or on the patch using an array of LEDs as mentioned above or an OLED display. Thus, any suitable display technology may be used to present the output information to the user in way which enables an easy association between the information and the relevant region of the breast.

The information from the milk flow map may be used to provide feedback to the mother. The mother can find the blocked duct easily by looking for lumps or hard spots in the indicated region. Advice can be given on how to solve the issue, for example applying a breast massage or a warm compress to that region to enable milk flow and prevent complete plugging of the duct.

Another helpful method to remove a blockage in the duct is to hold a vibrating object, e.g. an electrical toothbrush, to the skin, close to the blockage. Besides that, guidance on baby position during breast feeding can be provided. For example, if the low milk flow region is detected in the left side of the breast, the chin of the baby should point to that region during the next feeding session. The baby will empty that region during the next feeding session and prevent breast tenderness and the occurrence of uncomfortable lump.

Figure 5:
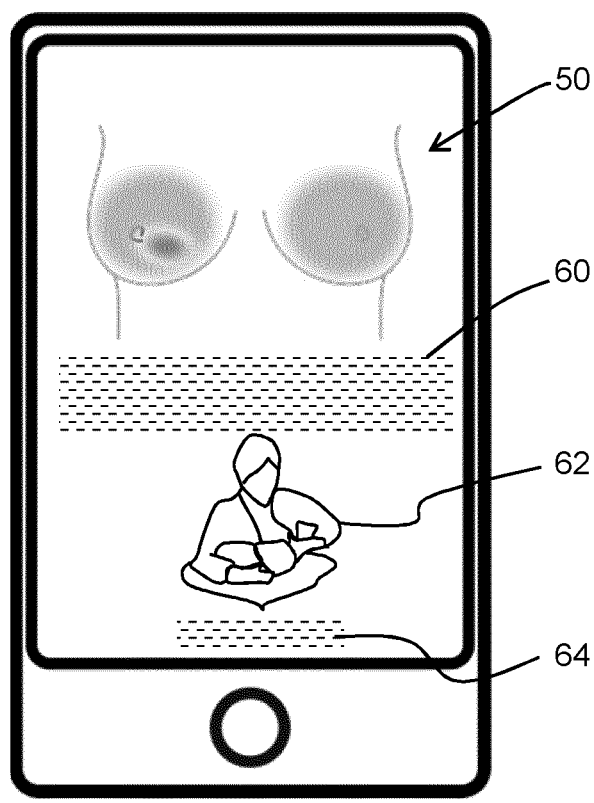
FIG. 5 shows a smartphone with a smartphone app for performing the processing and functioning as the display.

FIG. 5 shows a smartphone with a smartphone app for performing the processing and functioning as the display. It shows that the displayed image may show a representation of both breasts.

The flow sensor arrangement thus transmits the measured signals wirelessly to the smartphone which then processes the data (or even sends it to a remote data processing center).

The image display includes the flow map, a textual explanation 60 of what the flow map is indicating, a representation 62 of a suitable breast feeding position and a textual explanation 64 of the suitable breast feeding position. In this way, personalized breast feeding advice can be provided.

When the flow sensor arrangement forms part of a breast pump system, the system may be used to detect the milk ejection reflex (MER) and the number of MERs. This may be used as part of the control system of the breast pump system.

There is of course blood flow in the breast as in any part of the body. To further distinguish between the milk flow and noise resulting from blood flow and from movement, a first measurement may be done on the breast before the start of the breastfeeding sessions to provide a calibration. There may instead or additionally be a measurement at the start of the breastfeeding session but before start of milk flow until MER is detected. This provides a reference map which may be subtracted from the milk flow map.

The system may be used for real time monitoring during breast feeding. For this purpose, the flow map may be updated periodically, for example every period T, where T is between 1 second and 2 minutes, for example between 10 seconds and 1 minute. By continuous monitoring of the flow, developing conditions may be detected such as mastitis. This may for example involve the use of machine learning (and training) to recognize the evolution of flow patterns.

The personalized recommendations for feeding positions, durations etc. may also be derived by a machine learning algorithm.

Figure 6:
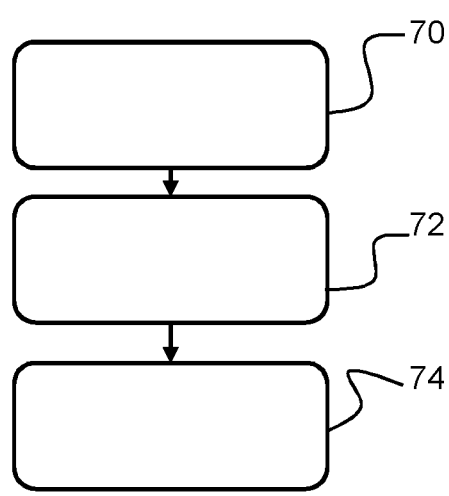
FIG. 6 shows a method for monitoring milk flow during breast feeding or during milk expression.

FIG. 6 shows a method for monitoring milk flow during breast feeding or during milk expression, comprising:

in step 70 obtaining signals from a flow sensor arrangement which is applied to the breast, and which monitors milk flow levels from different regions of the breast;

in step 72, generating a map of milk flow levels for different regions of the breast; and in step 74, displaying the map as an image.

The example above is based on a 2D map. However, a map may be represented as part of a 3D breast model.

The processing may be carried out locally or remotely.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

A computer program may be stored/distributed on a suitable medium, such as an optical storage medium or a solids state medium supplied together with or as part of other hardware, but may also be distributed in other forms, such as via the Internet or other wired or wireless telecommunication systems.

The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to". Any reference signs in the claims should not be construed as limiting the scope.

The invention claimed is:

1. A monitoring system operable by a user for monitoring milk flow during breast feeding or milk expression by the user, comprising:
   an acoustic or optical flow sensor arrangement for application by the user to a breast of the user, with known placement position relative to the breast, for monitoring milk flow levels from different regions of the breast;
   a processor for generating a map of the milk flow levels for the different regions of the breast; and
   a display device for displaying an image to the user in which the map is displayed with a representation of the breast of the user,
   wherein the processor is adapted to generate breast feeding guidance information for the user based on the milk flow levels.

2. The system as claimed in claim 1, wherein the processor generates the map of the milk flow levels for the different regions in a 2D plane.

3. The system as claimed in claim 2, wherein the 2D plane is parallel to a frontal plane of the user.

4. The system as claimed in claim 2, wherein each of the milk flow levels is an average flow per unit area of the map for a breast feeding session or part of the breast feeding session.

5. The system as claimed in claim 1, wherein the flow sensor arrangement comprises an ultrasound sensor and the processor is adapted to obtain the milk flow levels by performing Doppler ultrasound processing.

6. The system as claimed in claim 5, wherein the processor is adapted to:
   identify milk ducts by ultrasound image analysis;
   determine a direction of the milk ducts; and
   determine the milk flow levels in directions of the milk ducts.

7. The system as claimed in claim 6, wherein the processor is further adapted to identify milk duct diameters.

8. The system as claimed in claim 4, wherein the flow sensor arrangement comprises an array of sensor patches for application to the breast.

9. The system as claimed in claim 1, wherein the processor is adapted to obtain a reference map of the milk flow levels for the different regions of the breast before commencement of the breast feeding or milk expression, and to generate the map of the milk flow levels taking into account the reference map.

10. The system as claimed in claim 1, wherein the flow sensor arrangement is integrated into a brassiere type garment or a breast pump expression kit.

11. A method for a user to monitor milk flow during breast feeding or milk expression by the user, comprising:
   generating a signal representative map of the milk flow levels for the different regions of the breast based on a signal obtained from an acoustic or optical flow sensor arrangement which is applied by the user to a breast of the user, with known placement position relative to the breast, and which monitors milk flow levels from different regions of the breast; and
   generating breast feeding guidance information for the user based on the milk flow levels,
   wherein the map is an image of the whole breast of the user from which the different regions can be identified together with a representation of the breast.

12. The method as claimed in claim 11, further comprising generating the map of the milk flow levels for the different regions in a 2D plane and determining each of the milk flow levels as an average flow per unit area of the map for a breast feeding session or part of the breast feeding session.

13. A non-transitory, computer-readable medium having computer-executable instructions for performing a method of running a software program on a computing device, the computing device operating under an operating system, the method including issuing instructions from the software program comprising the method of claim 11.

14. The system as claimed in claim 1, wherein the breast feeding guidance information includes guidance for positioning a baby relative to the breast of the user.

15. The method as claimed in claim 11, wherein the breast feeding guidance information includes guidance for positioning a baby relative to the breast of the user.

16. The system as claimed in claim 1, wherein the map is a two-dimensional (2D) map devoid of depth information.

17. The system as claimed in claim 16, wherein the 2D map is combined with the representation of the breast in the image to the user.

18. The method as claimed in claim 11, wherein the map is a two-dimensional (2D) map devoid of depth information.

19. The system as claimed in claim 18, wherein the 2D map is combined with the representation of the breast an image to the user.

* * * * *